United States Patent [19]

Weinstein

[11] 3,898,899
[45] Aug. 12, 1975

[54] METHOD OF MAKING PACKAGE LINERS HAVING STARBURST PATTERNS CUT THERETHROUGH

[75] Inventor: David Weinstein, Baltimore, Md.

[73] Assignee: Maryland Cup Corporation, Owings Mills, Md.

[22] Filed: Nov. 7, 1974

[21] Appl. No.: 521,799

Related U.S. Application Data

[62] Division of Ser. No. 389,619, Aug. 21, 1973, abandoned.

[52] U.S. Cl. .................. 83/29; 83/620; 83/681; 83/926
[51] Int. Cl. .............................. B26d 7/06
[58] Field of Search ....... 83/29, 620, 621, 622, 651, 83/660, 667, 679, 681, 682, 694, 695, 697, 926 R; 93/58 R, 58 P, 58.4, 58.5

[56] References Cited
UNITED STATES PATENTS

| | | | |
|---|---|---|---|
| 2,260,573 | 10/1941 | Lorch | 83/29 |
| 2,297,177 | 9/1942 | Tiffany | 83/620 |
| 2,329,918 | 9/1943 | Leavens | 83/620 |
| 2,513,341 | 7/1950 | Marasco | 83/679 |
| 3,619,216 | 11/1971 | Weinstein | 426/124 |

FOREIGN PATENTS OR APPLICATIONS

| | | | |
|---|---|---|---|
| 814,502 | 9/1951 | Germany | 83/620 |

Primary Examiner—J. M. Meister
Assistant Examiner—Fred A. Silverberg
Attorney, Agent, or Firm—Birch and Birch

[57] ABSTRACT

A starburst pattern die is provided for cutting starburst patterns through multiple layers of sheet stock, in the formation of package liners or pads of the sheet stock for nestably receiving fragile articles in the starbursts. The starburst is characterized by an arcuate center part with the rays of the pattern defining the circumference of the part. This configuration precludes entanglement of the stacked sheet stock in the cutting process and permits ready separation thereof without tearing. The die for this pattern consists of a cylindrical center knife with a circular cutting edge and a plurality of radial knives butted thereto and extending outwardly therefrom, all mounted in the face of a cylindrical base block.

1 Claim, 4 Drawing Figures

PATENTED AUG 12 1975 3,898,899

SHEET 1

METHOD OF MAKING PACKAGE LINERS HAVING STARBURST PATTERNS CUT THERETHROUGH

This application is a division of Ser. No. 389,619, now abandoned.

This invention relates to die cutting of starburst patterns in multiple stacked sheets of packaging liners or pads for frangible articles and more particularly to a new and novel starburst pattern for such sheets and a die therefor.

BACKGROUND OF THE INVENTION

Arrays of starburst patterns cut through sheet stock (paper or the like) packaging liners are commonly used as retaining means in packaging ice cream cones or other frangible articles wherein one or more layers of such liners are used to nestably receive articles through the cut starbursts and retain them in a safe condition within an outer package.

In the manufacture of such liners or pads the conventional starburst configuration is akin to a plurality of radial cuts intersecting at a single and very fine center point.

Two primary disadvantages result from such a starburst configuration in the volume production of package liners or pads through the use of multiple layers of sheet stock beneath the starburst cutting dies.

First, the dies themselves must be of a finely honed intersecting construction which is subject to rapid wear and deterioration, requiring constant maintenance and undesirable down-time for the production machinery.

Second, the fine apices of the rays or leaves of the starburst patterns tend to interlock between the layers of sheet stock with the result that the finished liners or pads are difficult to separate and undesirable tearing or other damage to them results during separation.

OBJECTS OF THE INVENTION

It is an object of the present invention to provide a new and novel starburst pattern for package liners or pads which enhances the efficiency of manufacture thereof.

It is another object of the present invention to provide a new and novel starburst pattern for package liners or pads which are manufactured from multiple layers of sheet stock which precludes interlocking of the layers and provides for rapid and ready separation of the layers of the finished product.

Another object of the present invention is to provide a new and novel starburst pattern cutting die for the manufacture of package liners and pads from multilayered sheet stock.

These and other objects of the present invention will become more fully apparent with reference to the following specification and drawings which relate to a preferred embodiment of the invention.

SUMMARY OF THE INVENTION

The starburst die of the present invention comprises a "steel rule" die having a plurality of rules or cutting blades imbedded on edge in a base block in the general configuration of a starburst pattern. The base block is a cylindrical section having a plurality of radially disposed rules or knives set in one face thereof, which rules or knives extend from the outer periphery of the die face into butting relationship with side periphery of cylindrical rule or knife forming a symmetrical hub for the radial rules or knives in the center of the base block. Thus, in plan view, the cutting edges of the dies resemble the spokes and hub of a wheel.

The resulting starburst configuration cut by the die in sheet stock consists of a punched out hole with radial slits extending therefrom in a symmetrical or predetermined array, thus providing a nestable socket or port through the sheet stock for the ready reception of objects therethrough.

DETAILED DESCRIPTION OF THE INVENTION

Figure 1:
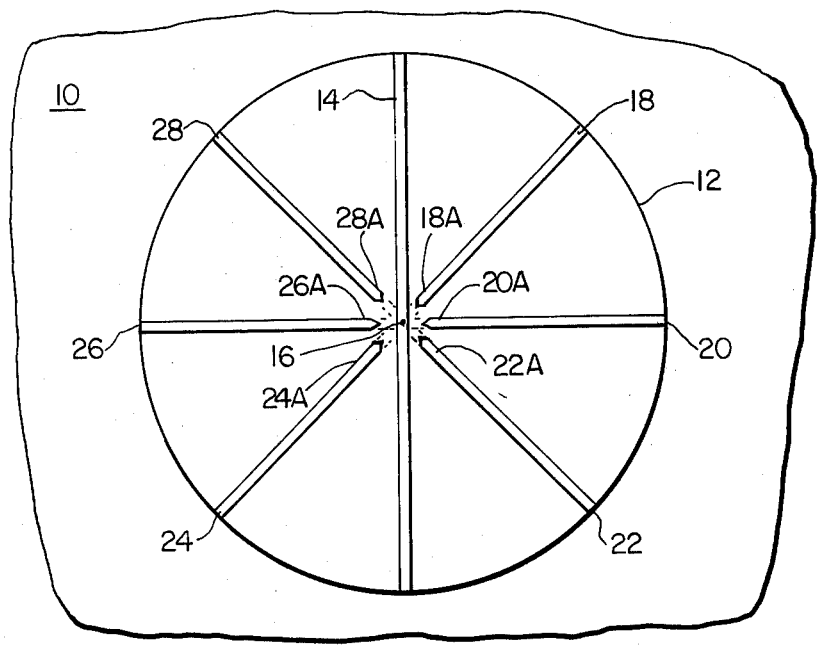
FIG. 1 is a plan view of a prior art starburst cutting die.

Referring first to FIG. 1, a prior art type starburst cutting die 10 is shown as including a cylindrical base block 12 with one rule or knife 14 extending across the full diameter of the block 12 through the center point 16 of the desired starburst pattern.

Six additional knives 18, 20, 22, 24, 26 and 28 of lengths corresponding to radii of the desired starburst pattern are radially and symmetrically disposed in the face of the base block 12 about the center point 16 of the desired starburst pattern.

Figure 2:
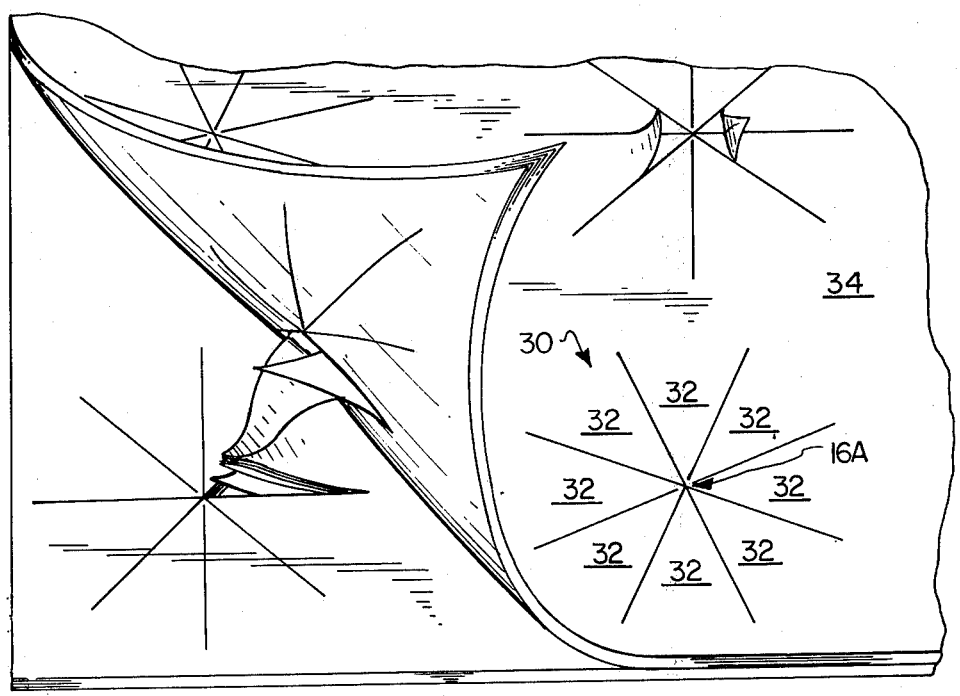
FIG. 2 is a perspective of multilayered sheet stock having cut starburst patterns therein illustrating the tendency of the leaves or rays of the starburst patterns to entangle and deform.

As shown in FIG. 2, the starburst pattern 30 has rays or leaves 32 which converge at the center point 16A thereof in a plurality of sharp apices.

In order to effectuate a complete cut through the center 16 of the starburst 30, the inboard tips 18A – 28A of the rules or knives 18 – 28, respectively, must abut the diametric rule of knife 14 at the center point 16 in the die configuration 10 and be mutually juxtaposed with the tips of those knives adjacent thereto on the same side of the diametric knife 14.

Thus, in order to make a clean narrow cut to a common point 16A in the starburst pattern 30, these rules or knives 18 – 28 must have their respective inboard ends 18A – 28A so tapered as to conform to the starburst pattern 30 so they will meet and form a small center point 16A therein and in order that they will offer the least resistance to piercing of the sheet stock and not tear or distort the same. These facts precludes joining of the blades at the center 16 and results in a tendency to warp and dull rapidly necessitating frequent change and down-time of the related production machinery.

This, coupled with the undesirable tendency of the rays 32 of the starbursts 30 in the multi-layered end product, namely, the liners or pads 34, as shown in FIG. 2, to interlock, entangle and distort, particularly in the area of the tips or apices of the said rays 32 adjacent the starburst center 16A, defines the prior art problems in producing such products.

Figure 3:
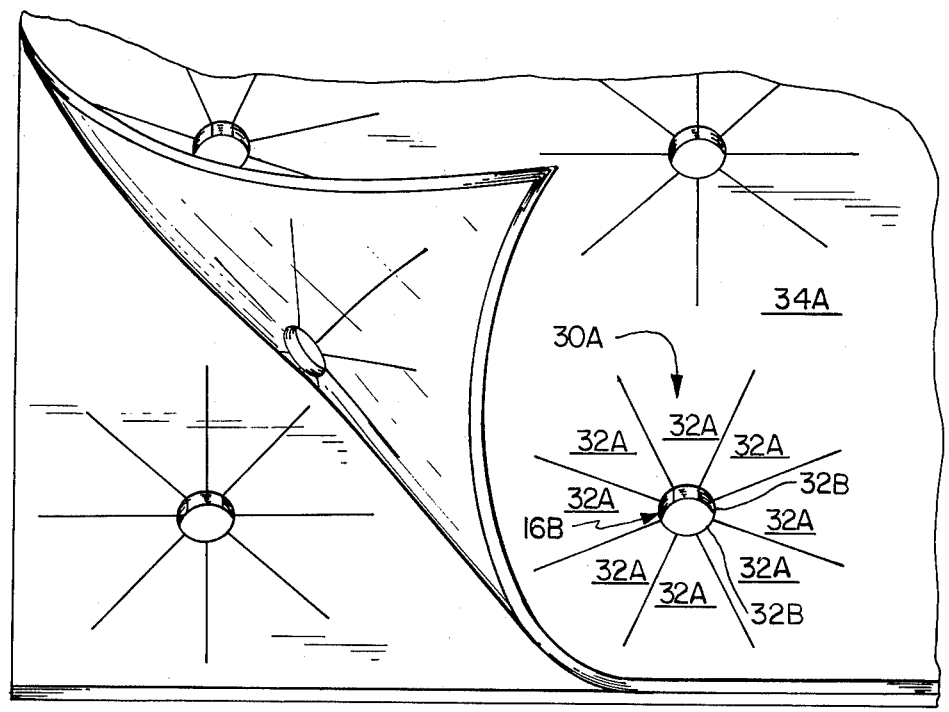
FIG. 3 is a perspective of multilayered sheet stock on which the starburst pattern of the present invention has been showing the lack of entanglement and deformation of the leaves or rays of the novel starburst.

Referring now to FIG. 3, the starburst pattern 30A of the present invention is shown as including a central circular port or opening 16B defined by adjacent arcuate inner ends 32B of the starburst rays or leaves 32A, the said arcuate inner ends 32B defining adjacent portions of the circumference of the central circular port 16B.

In the course of making cuts of this pattern 30A through multiple layers of sheet stock 34A it has been found to eliminate the tendency of the rays or leaves 32A of the starburst 30A from entangling and/or distorting. Furthermore, when the finished stock 34A is separated layer by layer there is substantially no resistance to such separation and tearing or other damaging of the said stock 34A no longer occurs during such separation.

Figure 4:
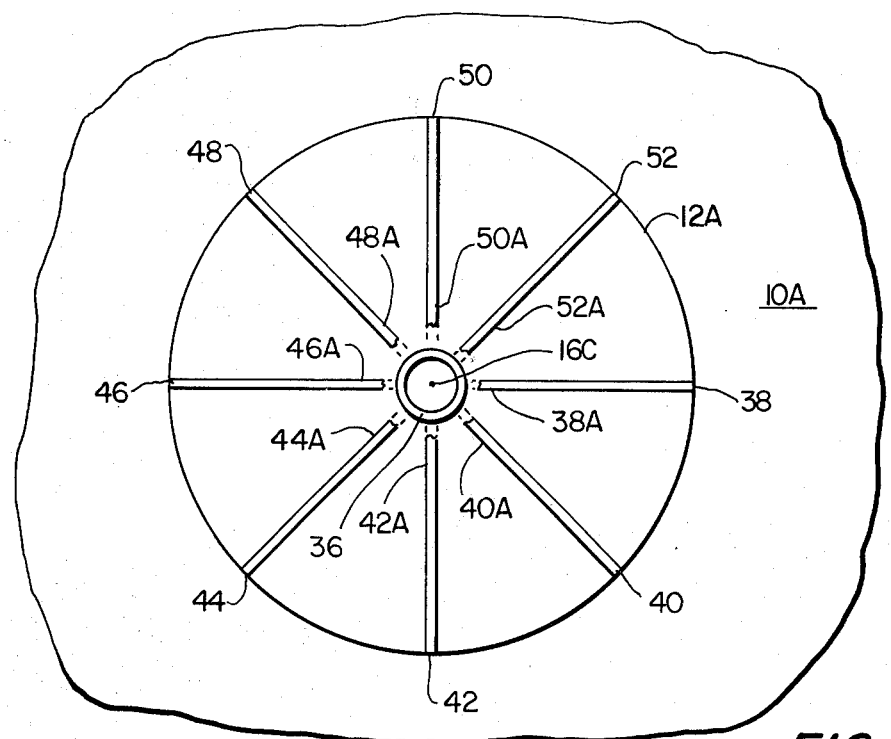
FIG. 4 is a plan view of the base block and cutting edge configuration of the starburst die of the present invention.

The novel die structure 10A for the starburst design 30A is shown in FIG. 4 as including a base block 12A of a cylindrical configuration in which is embedded a cylindrical rule or knife 36 circumscribing the center 16C of the die pattern and defining the cutting edge which results in the central port 16B being formed in the starburst patterns 30A of stock 34A of FIG. 3.

A plurality of radially extending rules or knives (eight for example) 38, 40, 42, 44, 46, 48, 50 and 52 are disposed about the periphery of the central rule 36 with the respective interior ends 38A – 52A thereof in butting engagement with the said periphery of the central rule 36.

In this configuration no tapering or alteration of the rules 38 – 52 is required to make the requisite starburst pattern cuts through the sheet stock 34A. As a result, the life of the dies 10A are materially enhanced and the problems of the prior art dies 10 are obviated.

The interior ends 38A – 52A of the knives 38 – 52 now being in a flat untapered condition results in increased strength, rigidity, and resistance to dulling and warping.

Furthermore, this configuration assures positive cut-through of the sheet stock at higher cutting speeds than could be utilized with prior art devices.

It should be noted that in FIGS. 2 and 4 there is an exaggerated gap between the interior ends of the radial knives (although they actually abut with the various related knives previously described) to better illustrate the configuration of the said interior ends.

From the foregoing description it can now be readily seen that the present invention satisfies a long felt need in the art, materially enhances the efficiency of production and substantially eliminates the undesirable characteristics and resulting loss of the finished product heretofore so prevalent in the prior art.

It is to be understood that the present invention may be modified as would occur to one of ordinary skill in the art without departing from the spirit and scope of this invention.

I claim:

1. A method of making package liners for fragile articles, said package liners having starburst patterns cut therethrough comprising the steps of:

providing a cutting means including a substantially centrally located cutting edge having a closed arcuate shape and a plurality of additional straight cutting edges extending radially from said centrally located cutting edge;

disposing a plurality of contiguous layers of sheet stock in alignment with said cutting means;

actuating said cutting means to pass said cutting edges through all of said contiguous layers of sheet stock; and separating said contiguous layers of sheet stock to form package liners having starburst patterns cut therethrough.

* * * * *